(12) United States Patent
Buchs et al.

(10) Patent No.: US 8,499,237 B2
(45) Date of Patent: *Jul. 30, 2013

(54) METHOD AND APPARATUS FOR APPLICATION ENABLING OF WEBSITES

(75) Inventors: Francois Buchs, Pompano Beach, FL (US); Zijad F. Aganovic, Delray Beach, FL (US)

(73) Assignee: Hiconversion, Inc., Boca Raton, FL (US)

( * ) Notice: Subject to any disclaimer, the term of this patent is extended or adjusted under 35 U.S.C. 154(b) by 1474 days.

This patent is subject to a terminal disclaimer.

(21) Appl. No.: 11/729,569

(22) Filed: Mar. 29, 2007

(65) Prior Publication Data

US 2008/0244509 A1    Oct. 2, 2008

(51) Int. Cl.
*G06F 17/00* (2006.01)
*G06F 3/048* (2006.01)

(52) U.S. Cl.
USPC ............ 715/255; 715/200; 715/272; 715/764

(58) Field of Classification Search
USPC ................. 715/200, 243, 253, 255, 234, 272, 715/764; 709/246
See application file for complete search history.

(56) References Cited

U.S. PATENT DOCUMENTS

| | | | | |
|---|---|---|---|---|
| 6,405,316 B1* | 6/2002 | Krishnan et al. | ............ | 713/190 |
| 6,601,057 B1* | 7/2003 | Underwood et al. | ......... | 715/234 |
| 7,681,112 B1* | 3/2010 | Francis | .......................... | 715/234 |
| 2002/0023112 A1* | 2/2002 | Avital | ............................ | 707/513 |
| 2002/0078147 A1* | 6/2002 | Bouthors et al. | .............. | 709/203 |
| 2004/0215719 A1* | 10/2004 | Altshuler | ...................... | 709/204 |
| 2005/0223363 A1* | 10/2005 | Black-Ziegelbein et al. | . . | 717/127 |
| 2006/0095835 A1* | 5/2006 | Kennedy et al. | .............. | 715/764 |
| 2006/0143222 A1* | 6/2006 | Daniel | .......................... | 707/102 |
| 2007/0067297 A1* | 3/2007 | Kublickis | .......................... | 707/9 |
| 2008/0235671 A1* | 9/2008 | Kellogg et al. | .............. | 717/139 |

* cited by examiner

*Primary Examiner* — Chau Nguyen
(74) *Attorney, Agent, or Firm* — Gregory P. Gadson

(57) ABSTRACT

A novel method of application enabling of a web page at least includes: a) via a World Wide Web browser, connecting to a website targeted for application enabling; b) generating browser-compliant end-user code for the rendering of a web page on an end-user device; c) rendering a web page associated with the website; d) providing the website source code; e) via a graphical user interface (GUI), providing on a rendered web page, locations in the end-user code corresponding to sections or aspects of the rendered web page selected by the user; f) via the GUI, providing application enabling code to be inserted at the locations identified in element e) according to an action chosen by the user corresponding to a third party application to be enabled in the website; g) automatically mapping code locations selected in element e) with corresponding locations of the website code; and h) inserting the code of element f) into the corresponding website source code locations is of element g); wherein the code of element f) enables a third party software application adapted to modify the functionality of the website.

10 Claims, 6 Drawing Sheets

METHOD AND APPARATUS FOR APPLICATION ENABLING OF WEBSITES

BACKGROUND OF THE INVENTION

1. Field of the Invention

The present invention relates to schemes for modifying and expanding the functionality of websites.

2. Background

Third party web software applications have been developed to enhance website functionality and enhance website management. A deployment of such applications requires the placement of additional lines of code into the source code of the website. The process of placing additional lines of code into the source code in order to activate third party software applications for particular functions may be thought of as application enabling.

Prior art approaches to application enabling websites has heretofore been limited to methods requiring a breadth of programming and programming language knowledge, thereby limiting the distribution and use of third party developed web applications. Further, website source code is often poorly documented, as well as poorly structured, so that even seasoned website programmers may have difficulty creating modifications. Even where appropriately qualified individuals are involved in the website modification process, the tedious nature of the exercise can lead to errors and mistakes, and is also a time-consuming process.

Some examples of third party web applications include website optimization solutions, web analytics, and web content management solutions that enable more effective website management. Similarly, there are reusable components that enable shopping cart functionality, news section management, and other website functionality that may be handled by third party web applications.

In today's online commerce and technology environments, there is a great need for application enabling of websites in a non-programming manner, to enable the reuse of third party developed, specialized components that will increase the capabilities and efficiencies of websites, while at the same time reducing the development cost and time needed for implementation.

SUMMARY OF THE INVENTION

In view of the aforementioned problems and deficiencies of the prior art, the present invention provides a method of application enabling of a web page that at least includes: a) via a World Wide Web browser, connecting to a website targeted for application enabling; b) generating browser-compliant end-user code for the rendering of a web page on an end-user device; c) rendering a web page associated with the website; d) providing the website source code; e) via a graphical user interface (GUI), providing on a rendered web page, locations in the end-user code corresponding to sections or aspects of the rendered web page selected by the user; f) via the GUI, providing application enabling code to be inserted at the locations identified in element e) according to an action chosen by the user corresponding to a third party application to be enabled in the website; g) automatically mapping code locations selected in element e) with corresponding locations of the website source code; and h) inserting the code of element f) into the corresponding website code locations of element g); wherein the code of element f) enables a third party software application adapted to modify the functionality of the website.

The present invention also provides a system for application enabling of a web page that at least includes: a) a World Wide Web browser, adapted to connect to a website targeted for application enabling, and render a web page associated with the website; b) an end-user code generator adapted to generate browser-compliant end-user code for the rendering of a web page on an end-user device; c) a website source code provider adapted to provide the website source code; d) a graphical user interface (GUI), adapted to provide on a rendered web page, locations in the end-user code corresponding to sections or aspects of the rendered web page selected by the user, and adapted to provide application enabling code to be inserted in the website source code at the identified location in the end-user code according to an action chosen by the user corresponding to a third party application to be enabled in the website; e) a mapper adapted to automatically map code locations selected in element d) with corresponding locations of the website source code; and f) a code inserter adapted to insert the code provided by element d) into the corresponding website source code locations provided by element e); wherein the code of element d) enables a third party software application adapted to modify the functionality of the website.

BRIEF DESCRIPTION OF THE DRAWING FIGURES

Features and advantages of the present invention will become apparent to those skilled in the art from the description below, with reference to the following drawing figures, in which.

DESCRIPTION OF THE PREFERRED EMBODIMENTS

Figure 1:
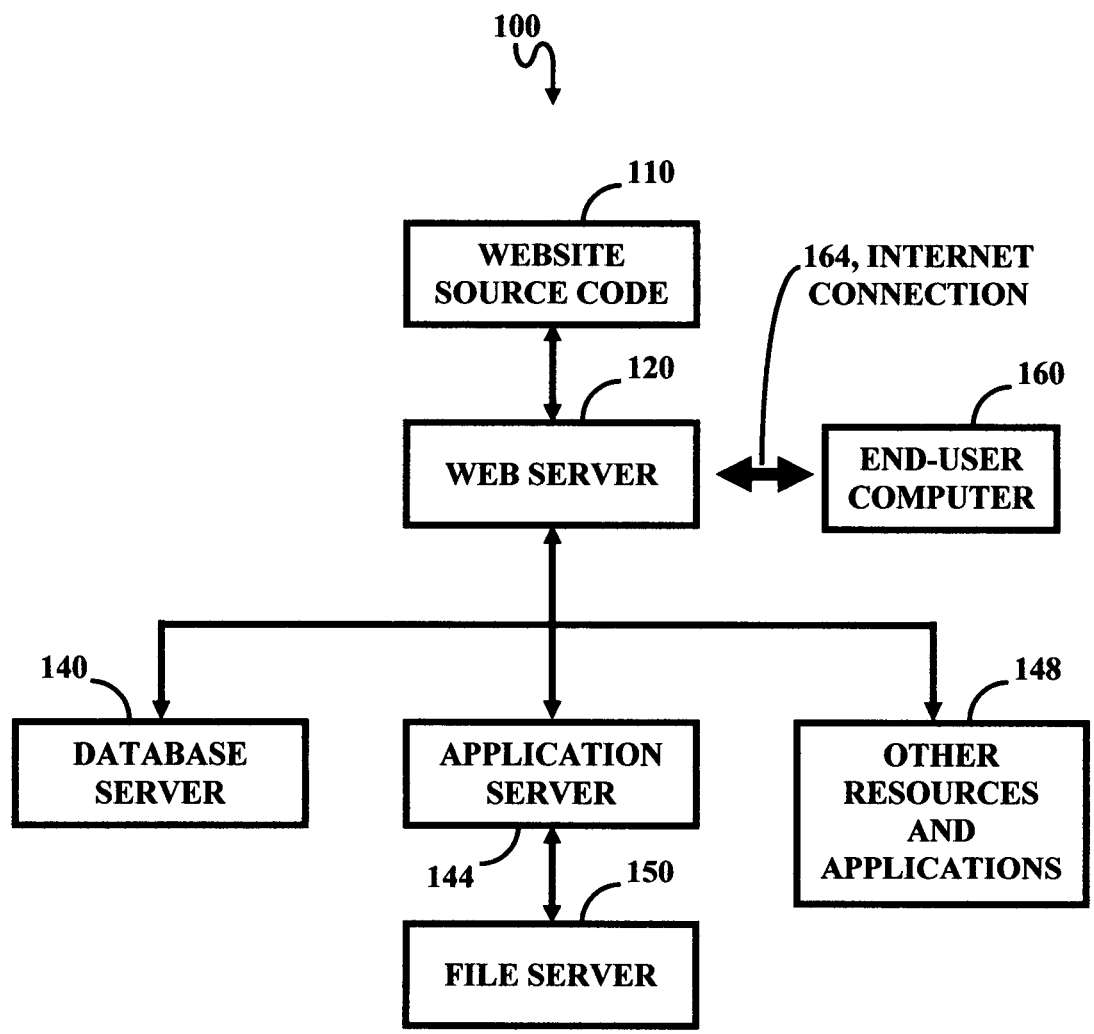
FIG. 1 is a schematic diagram of a general system for web page delivery and rendering on an end-user device.

FIG. 1 illustrates the general architecture of a system 100 capable of delivering web pages through interaction with an end-user web browser. The website and the associated web pages are formed by executing website source code represented by the number 110, as will be appreciated by those skilled in the art. A web server 120 runs the website source code 110 using one or more operating systems, which may include such popular operating systems as Linux®, Unix®, Windows®, Vista®, and others.

The system includes additional servers necessary for carrying out the website functions, including for example, a database server 140, an application server 144, a file server 150, and other resources and applications symbolically represented by the number 148. Each of the servers can use a different operating system. In accordance with the World Wide Web protocols, one or more end-user computers or devices 160 are used to access the website via an Internet connection 164. A web browser which may be installed on the device 160 allows web pages to be viewed by a user upon being rendered by the browser.

A process of web page rendering for viewing in the end-user web browser is further described with reference to FIG. 2. The website server 220 transforms the website source code 110 into a corresponding end-user code 270 which complies with web browser requirements. The source code 110 may comprise several components programmed in different programming languages. Such programming languages include, but are not limited to JAVA, Hypertext Markup Language (HTML), PHP, PYTHON, and many others. These components provide the desired website functionality through the use of systems described in FIG. 1.

After the transformation by the web server, end user code that complies with World Wide Web conventions might have some components that are exactly the same, while other components may look significantly different than the website source code. For example, the components 2 and 4 (214 and 218) of the source code which are written in HTML, remain in HTML in the end-user code as the corresponding components 2 and 4 (274 and 278). However, the browser in the example is incapable of executing code written in PYTHON, which is why the web server will process PYTHON code and transform a component 3 (216) of the source code to, for example, browse readable content in the end-user code (new component 3, numbered 276). Similarly, the component 5 (219) written in Server JAVA language is also converted to browser readable HTML content (new component 5, numbered 279).

Figure 2:
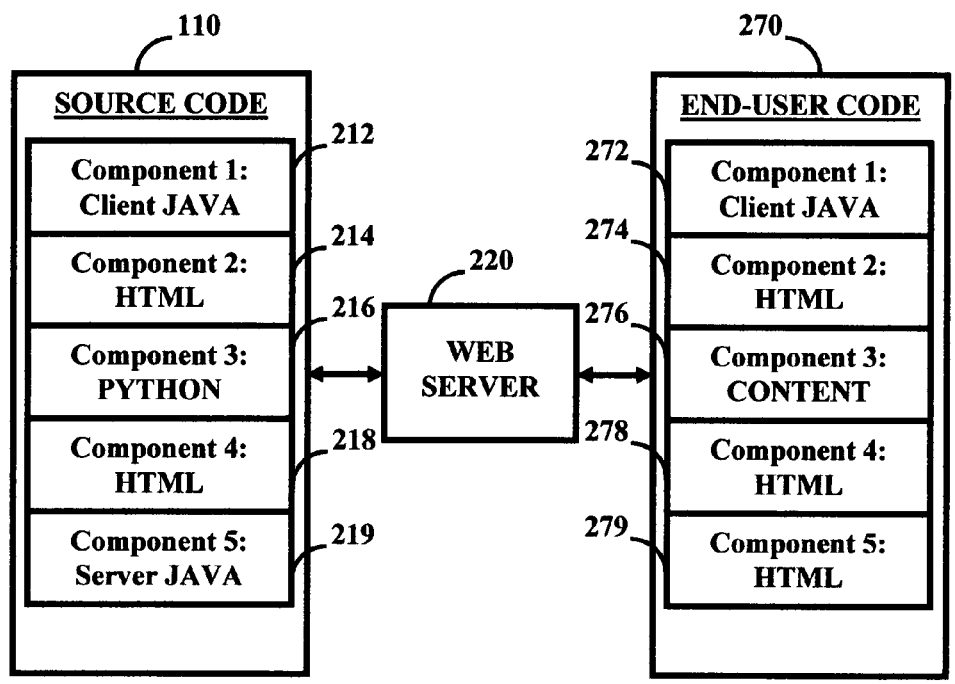
FIG. 2 is schematic diagram of an example of browser-compliant end-user code generated in response to an end-user request to view a selected web page.

The web server can successfully perform transformation of the source code for the purpose of rendering of a web page in the end-user web browser described in FIG. 2 only in concert with the entire system described in the FIG. 2. If any system component is missing, the web page might not render correctly, if at all. Therefore, for any visual application enabling method to work, the access to a correctly rendered web page is essential. The system described in the FIG. 1 can be replicated on a case by case basis, but this is not practical or economical in any mass web application enabling scenario.

Figure 3:
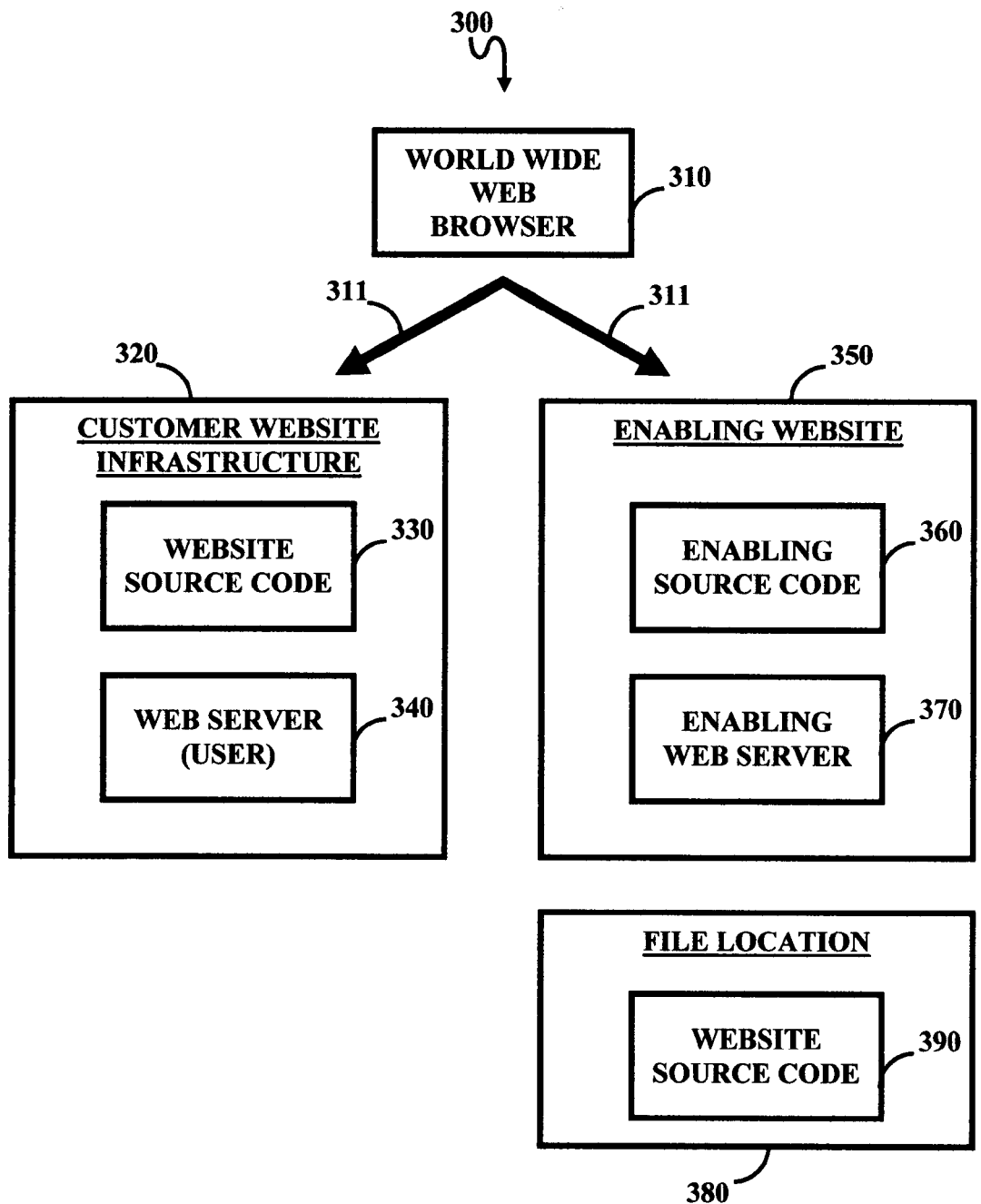
FIG. 3 is a general diagram of the present-inventive web application enabling system.

In accordance with the present-inventive system 300 as illustrated by FIG. 3, one or more end-user computers or devices 310 (labeled as World Wide Web Browsers) are used to modify the functionality of a website via an Internet connection 311.

The present-inventive website application enabling method and system can be carried out via an application enabling toolkit 360 directly installed on an end-user server 340, or alternatively, the method and system can be carried out using an application service provider approach. The toolkit may even be at least partially installed on the end-user computer.

A key feature of the present invention is the ability of end-users to perform application enabling steps through a visual graphical user interface (GUI) that renders a current live web page that has been delivered via a customer's website infrastructure 320. The application enabling toolkit is initiated from the enabling website 350. This activates a visual editing GUI on the end-user web browser 310. The GUI allows the end-user to navigate the web page rendered on the end-user computer, and allows the end-user to perform web application enabling and selections in a "what you see is what you get" fashion, without direct access or knowledge of the programming source code.

The selections and actions made by the end-user are automatically mapped to the corresponding source code location in preparation for the application enabling process. That is, the end-user can perform application enabling of a web page by highlighting (tagging) in some fashion, the portion of the rendered web page where application enabling will be physically applied. A "mouse" or other pointing device can be used for highlighting, and other highlighting approaches can also be used, such as "pop-up" displays. Based upon the end-user input, the application enabling process will perform in a seamless manner, the necessary web page source code changes. A copy 390 of the website source code 330 can be made available to the application enabling solution at a mutually accessible file location 380.

The term "visual tagging" is used here to denote that the web page locations of interest are "tagged" and made visible to the user and the corresponding locations of the source code are automatically located.

Figure 4:
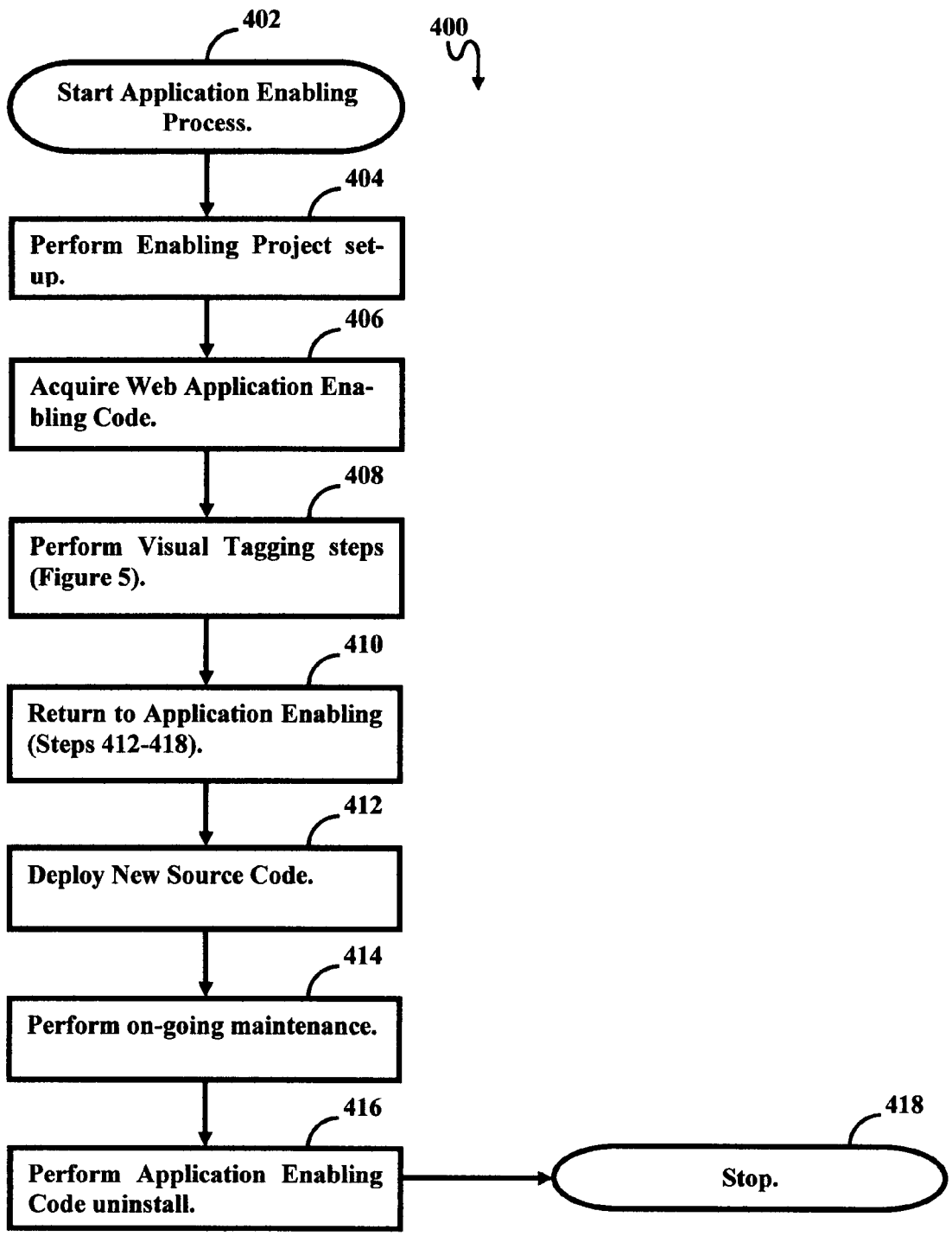
FIG. 4 is a flowchart illustrating a one possible process of a third party website application enabling process which is used to modify the functionality of a website, and in which the website is application enabled using the present-inventive visual tagging steps.

The present-inventive website application enabling process utilizing visual tagging is illustrated in FIG. 4. In the example given, the application enabling process is used to insert the necessary lines of code into the website source code needed to run a website optimization program 300. Recall that website optimization is just one example of website functionality modifications. The process can apply to any other web application enabling process, as well.

As shown in FIG. 4, the website application enabling process 400 begins with Step 402, followed by the project setup (Step 404). In this step, the end-user defines the identity, scope, and participants in the web application enabling project. For example, in the website optimization case, the end-user can name the optimization experiment, define test pages, sections, variations, and goals associated with the experiment, and define contributors to this project, such as the designer, manager, etc. This step also generically includes security and authorization to ensure that website optimization is performed only by those who have been granted access.

The web application enabling code is acquired in Step 406. In this step, the program acquires application enabling code from third party applications as needed to optimize the website. In the website optimization example, a program will request optimization enabling code from the web optimization application provider. One such provider is Google, with its Website Optimizer that generates unique scripts that need to be inserted in the proper location of the web page so that the page can be optimized via the aforementioned Website Optimizer.

Figure 5:
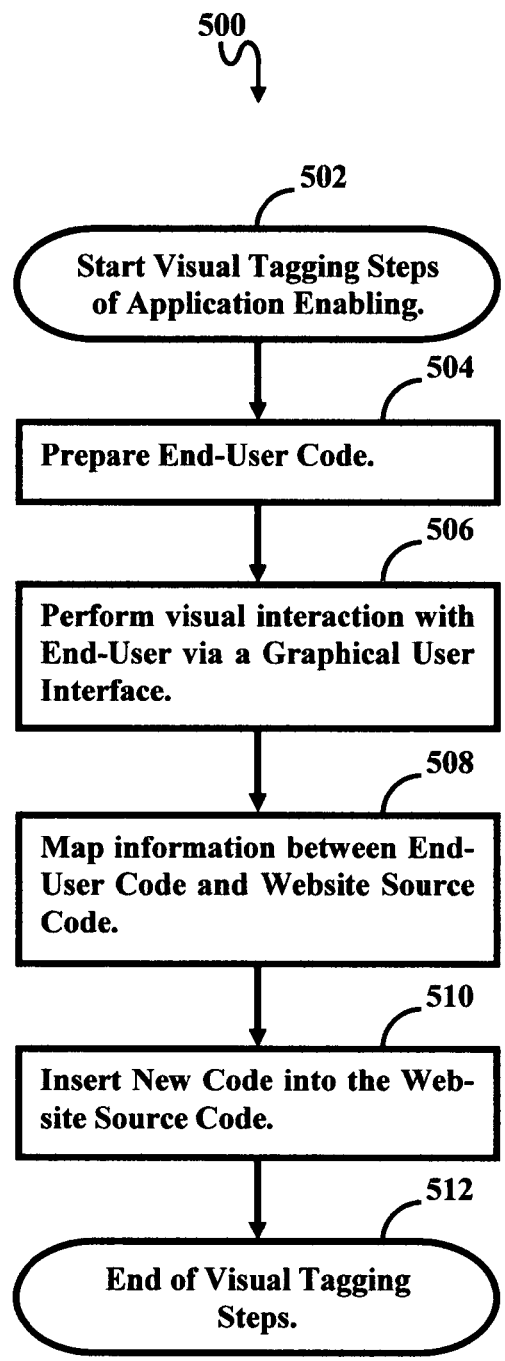
FIG. 5 is a flowchart detailing the visual tagging steps of the present-inventive application enabling method.

Beginning with Step 408, the visual tagging steps of the application enabling process are performed, as more fully defined by the illustrations in FIG. 5. The first step in the visual tagging process after the start (502) is to prepare the end-user code (Step 504). In this step the program launches an Internet browser session with the rendered web page that will be application enabled in conjunction with enabling a graphical user interface (GUI) application and optional end-user code processing. Namely, the GUI application can determine locations in the end-user code statically via HTML invisible tags that might be inserted after each element in the end-user code, or dynamically via execution of a location matching algorithm. In any case, the appearance of the web page includes a GUI interface and additional visual components that provide enabling functionality and indicators of the enabling work in progress.

Visual interaction between the end-user and the browser rendered web page that is the subject of the application enabling process is performed in Step 506 via a graphical user interface (GUI). The use of the GUI facilitates the user's visual identification of the areas or aspects of the web page that will participate in the web application enabling modification, together with application enabling functionality that will be placed in that area of the rendered web page. This visual GUI input is then automatically processed to identify corresponding locations or areas of the end-user code that will participate in the web application enabling.

In the step that follows, the information about locations or areas of the end-user code that will participate in the web application enabling process will be further processed and mapped into the locations or areas of the website source code. For example, the use of enabling solutions in the website optimization scenario by a provider such as Hiconversion, Inc., the assignee of the present Letters Patent, will enable an end-user to visually identify sections of the website that will be included in the website optimization experiment. Namely, as the end-user moves a mouse over the area recognized by the enabling application, those areas are dynamically flagged by some visual effect like, but not limited to, a frame or semi-transparent color. By selecting this area, a user can in essence define a section of the website that will participate in the optimization, and create a permanent indicator that this area is already selected.

Or, to illustrate aspects (or attributes) of the web page that might participate in the web optimization experiment an end-user might use the present-inventive GUI interface to expose and select invisible web page style definitions that determine how a web browser will render fonts or web page background color. In either case, as the result of the end-user selection, the enabling application will first identify locations in the end-user code that belong to the user selected section, and then process website source code to insert website optimization enabling code in the proper location of the website source code. The website optimization enabling code will then 'hook' this section with the optimization application that will automatically change its content in accordance with the optimization methodology.

The mapping step (508) correlates the components of the end-user code that are selected for participation in the application enabling with the associated locations of the website source code at which application enabling code are to be inserted into website source code to effect application enabling. This is because the lines of the end-user code will often not directly correspond to the same lines of the website source code as it was described in connection with FIG. 2. The mapping algorithm, then, performs the actions for locating the proper source code lines needed for code insertion based upon end-user selected web page areas.

As result of mapping actions between the end-user and website source code, a system may detect that certain end-user selections might not be feasible or may not be performed automatically via the visual GUI process. These selections, in return, can be visually marked. An example involves the desire of end-user to application enable a section of the web page that is generated by server side Java code. Inserting application enabling code might be prohibitive or might not work at all.

There are many possible ways of carrying out the mapping function to compare the relevant source code lines with the end-user code lines which are beyond the scope of the present Letters Patent. The enabling application code is inserted into the website source code in Step 510, creating a new source code which will need to be published back on the end-user web server for application enabling to take the effect. In one embodiment, the new source code is generated automatically in response to the editing actions of the end-user. In another embodiment, the end-user can insert code from a menu or window of application enabling code options for the selected area according to his or her desire. The visual tagging process ends at Step 512.

After completion of the visual tagging steps, the algorithm returns to the web application enabling steps (412-418), beginning with Step 410 in FIG. 4. In Step 412 the web application enabling process performs deployment of the new version of the source code on the end user web server. Step 414 performs on-going maintenance of the website application enabled code in accordance with requirements dictated by the enabling web application provider. Programs and third party applications that are no longer relevant or needed are uninstalled in Step 416.

To further illustrate these steps refer again to the website optimization example. After identifying elements of the website that will participate in the optimization experiment via the visual GUI step as described in FIG. 5, the end user will publish a new version of the website source code on the production system described in FIG. 1. In so doing, optimization enabled sections of the website will become active and begin interacting with the website optimization application. For example, in Google's aforementioned optimization solution, the end-user website begins interacting with Google's tool. As result, Google will instruct the end-user website to display a particular version of the web page, and then measure visitors' responses. Both of these functionalities are possible through additional code that was inserted into website source code. To illustrate a need for on-going maintenance, again refer to the aforementioned Google example. It is possible that Google will change a version of its optimization technology that will require that a new version of the website application enabling code will need to be inserted into the website source code. As a result of project setup information, the present-inventive method will be able to automatically perform such change, and generate a new version of the website source code compliant with a new version of Google's application.

To illustrate a need for the uninstall step, Google's aforementioned website optimization application is again referenced. Assume for example, that an end-user desires to optimize the performance of a landing page. Once best version is found, there is no need for the optimization capabilities on that page. To make sure that this page is cleaned from the optimization enabling code, the present-inventive method performs that step automatically.

Figure 6:
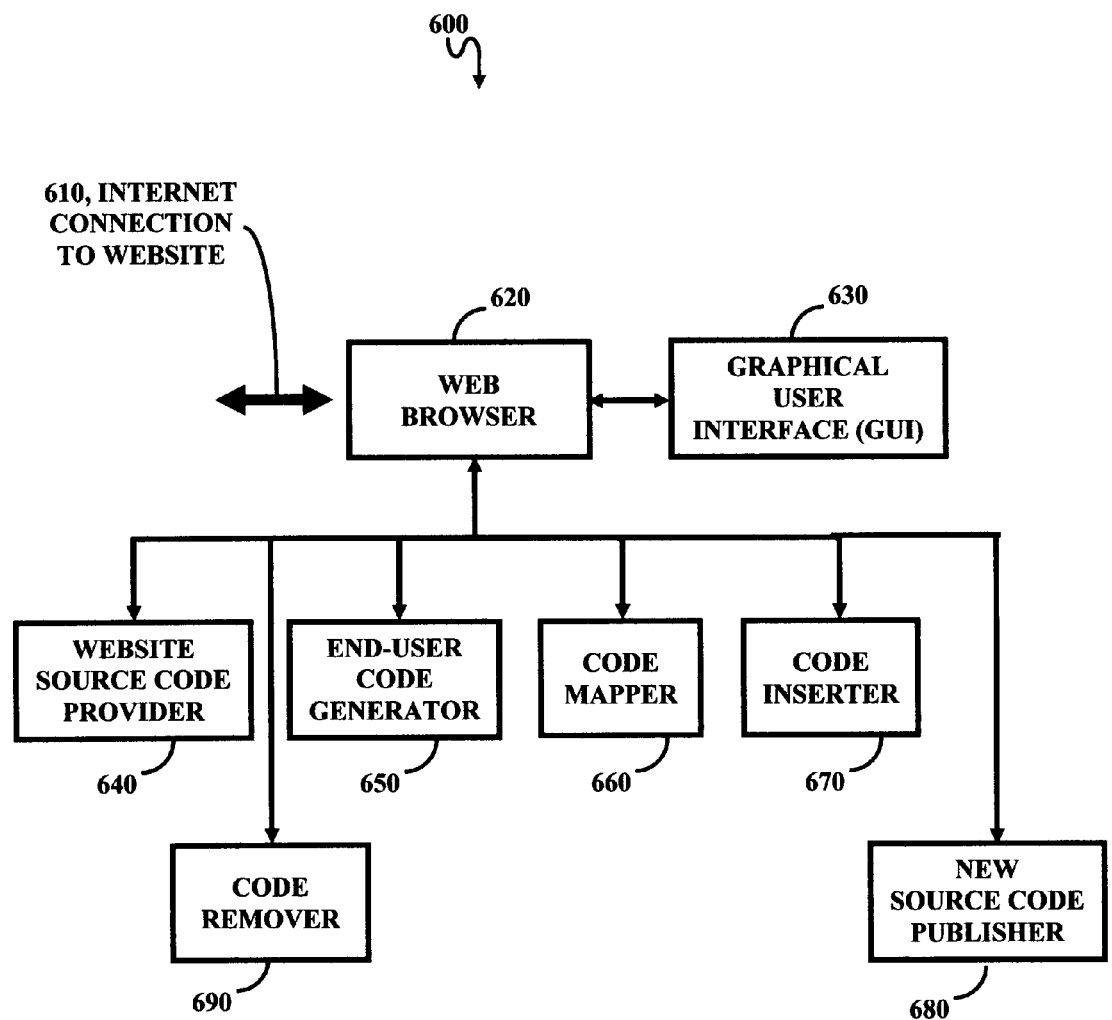
FIG. 6 is a more specific schematic block diagram of a system adapted to carry out the present-inventive website application enabling process.

One embodiment 600 of a system capable of implementing the present-inventive website application enabling process is illustrated in FIG. 6. The system components may be in modular software form, with the exception of components such as the Internet connection labeled 610. These components may also be primarily included as part of a toolkit installed on the end-user computer or the end-user web server system. Alternatively, the primary components of the present-inventive website application enabling process can reside on third party owned computing infrastructure designed to provide on-demand web application enabling services through a remote access for the authorized end-users.

The basic functionality of system components has been described above with respect to the method and algorithm illustrated by the flowchart of FIG. 5. A web browser 620 renders a web page based upon the information received from the targeted website via the connection 610. A website source code provider 640 provides the website source code to the system. An end-user code generator 650 generates an end-user code derived from the website source code and web application enabling toolkit, which then provides the end-user with the rendition of the targeted web page together with the running GUI interface 630. The end-user operates the tool and carries out the steps of the application enabling process via a graphical user interface (GUI) 630, enabling the end-user to make selections of the web page sections or web page attributes.

A code mapper 660 carries out the mapping functions of the present invention by mapping the visual input provided by the end-user via the GUI interface, and determining the location where the web application enabling code insertion is to take place in the website source code. A code inserter 670 inserts the appropriate scripts and other code into the identified location of the website source code. In one embodiment of the present invention a new source code publisher 680 creates a new version of the source code, including the application enabling code necessary for application enabling, and then publishes the new source code back to the web server for adoption of the new source code by the website.

In one alternate embodiment the code inserter 670 automatically updates the application enabling code in the website source code when dictated by changes to the third party software application. Also, a code remover can automatically remove application enabling code when such code is no longer appropriate or viable.

Variations and modifications of the present invention are possible, given the above description. However, all variations and modifications which are obvious to those skilled in the art to which the present invention pertains are considered to be within the scope of the protection granted by this Letters Patent.

What is claimed is:

1. A method of application enabling of a web page comprising:
   a) via a World Wide Web browser, connecting to a website targeted for application enabling;
   b) generating browser-compliant end-user code for rendering of a web page on an end-user device;
   c) rendering the web page associated with said website;
   d) providing website source code of the website;
   e) via a graphical user interface (GUI), providing on the rendered web page, locations in the browser-compliant end-user code corresponding to sections or aspects of the rendered web page selected by a user;
   f) via said GUI, providing application enabling code to be inserted at the locations selected in element e) according to an action chosen by said user corresponding to a third party application to be enabled in the website;
   g) automatically mapping the locations of the browser-compliant end-user code selected in element e) with corresponding locations of said website source code; and
   h) inserting the application enabling code of element f) into the corresponding locations of said website source code of element g);
   wherein the application enabling code of element f) enables a third party software application adapted to modify functionality of said website.

2. The method of claim 1, further comprising:
following element h), publishing a new version of the website source code back to said website.

3. The method of claim 1, further comprising:
via said GUI, indicating sections or aspects of the rendered web page available for functionality modification.

4. The method of claim 1, further comprising:
via said GUI, indicating where application enabling code insertion is not appropriate for a particular functionality modification.

5. The method of claim 1, wherein element a) further comprises connecting to said website via the World Wide Web.

6. The method of claim 1, wherein element a) further comprises connecting to a server of said website via an Intranet.

7. The method of claim 1, wherein element a) further comprises connecting to a server of said website via a local area network.

8. The method of claim 1, wherein element f) comprises any variety of programming code.

9. The method of claim 1, further comprising:
automatically updating website application enabling code at appropriate website source code locations, when said application enabling code changes.

10. The method of claim 1, further comprising:
automatically removing the application enabling code from said website source code when said application enabling code is no longer appropriate or desired.

* * * * *